Dec. 8, 1970   L. E. SOMERS ET AL   3,545,843
MAGNETO-OPTICAL DISPLAY SYSTEM
Filed Jan. 9, 1969   4 Sheets-Sheet 4
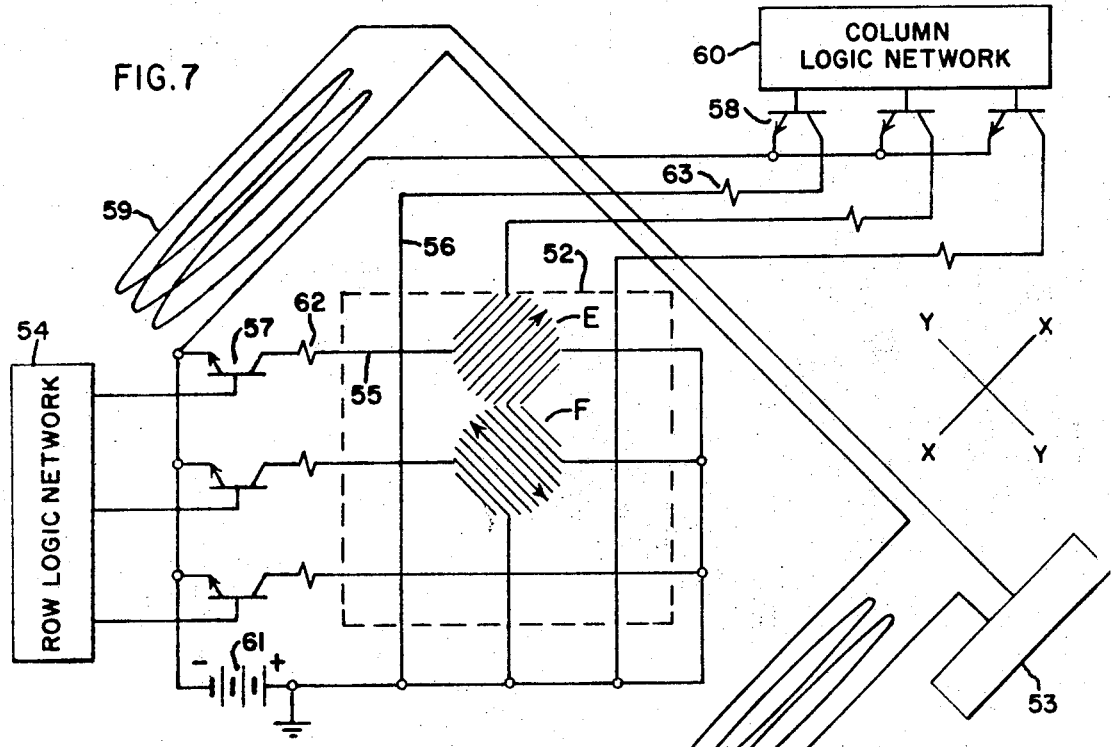
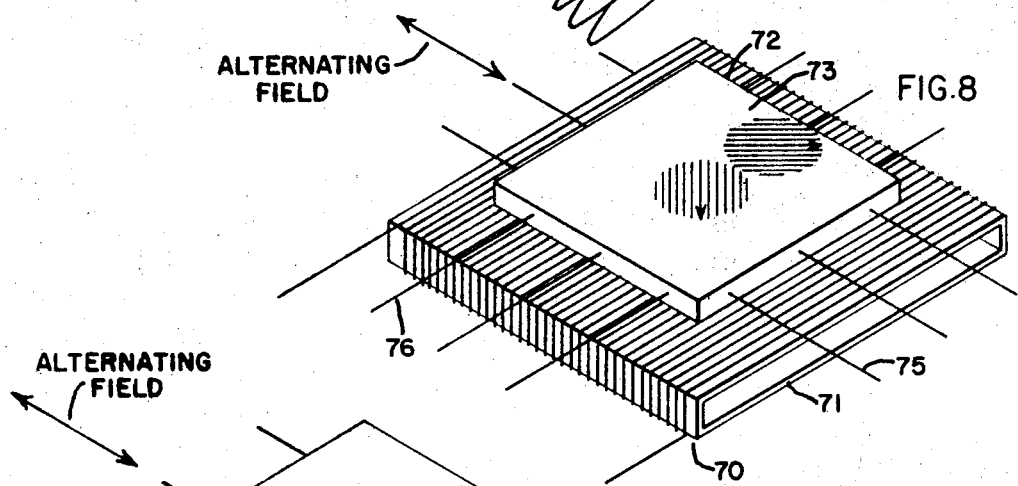
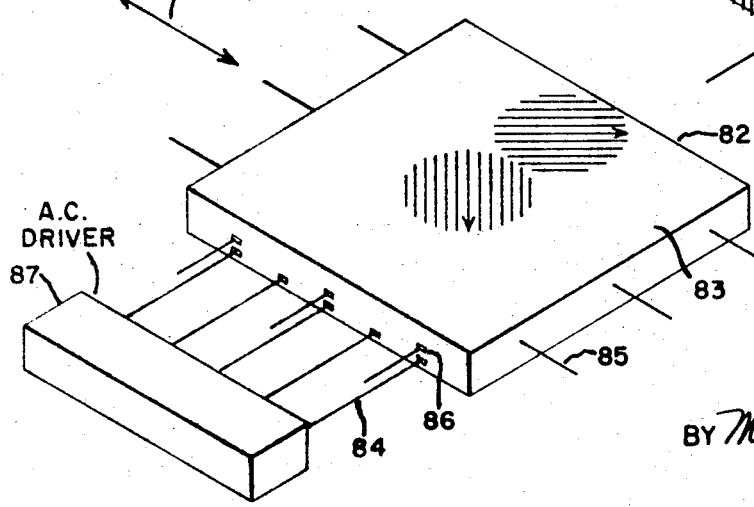
INVENTORS:
LEWIS E. SOMERS,
ROBERT E. GLUSICK,
BY Marvin L. Edenberg
THEIR ATTORNEY

United States Patent Office 3,545,843
Patented Dec. 8, 1970

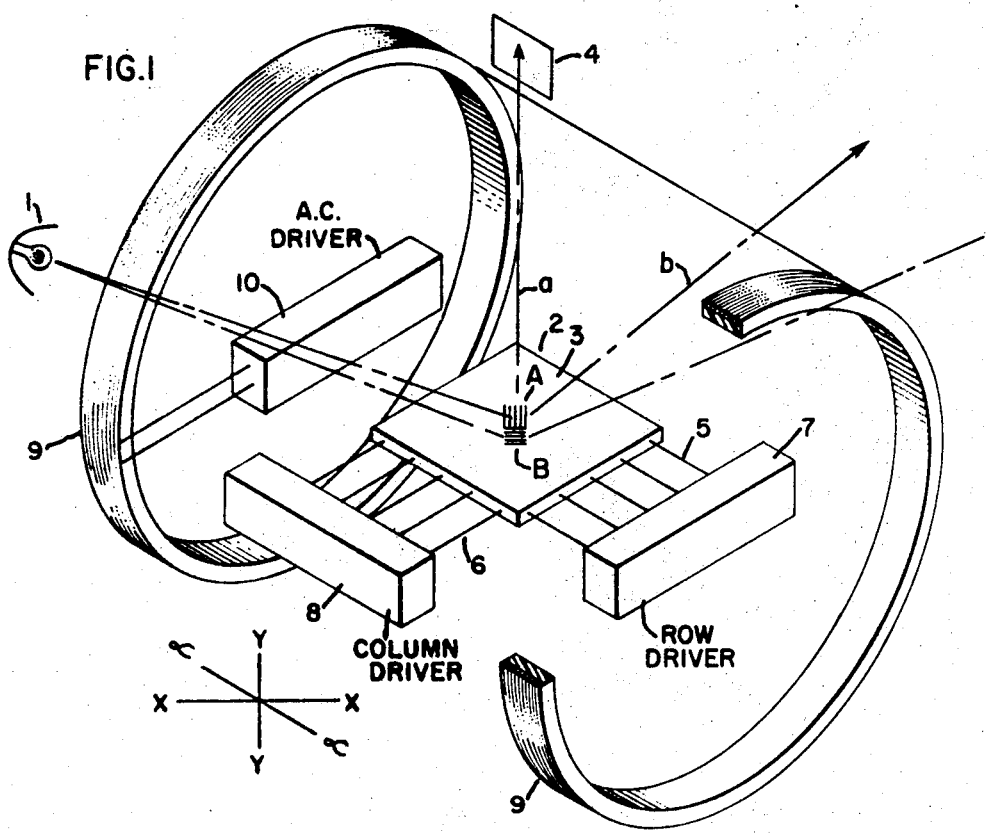
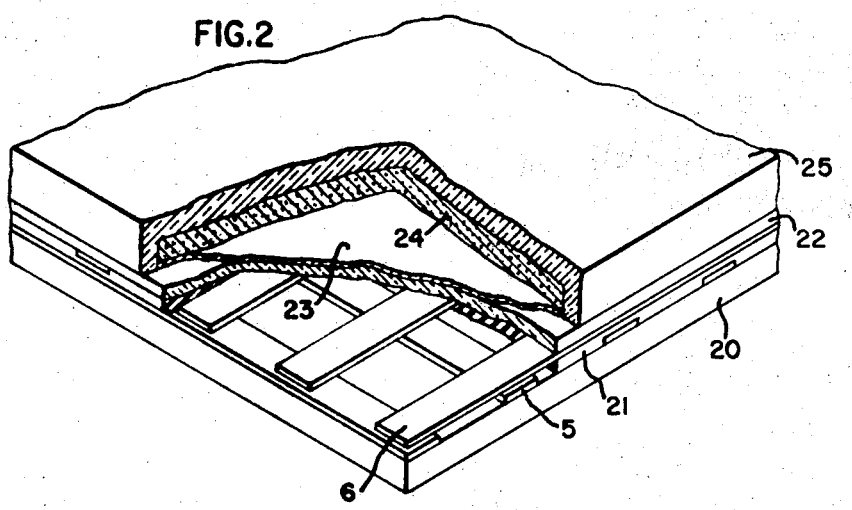
INVENTORS:
LEWIS E. SOMERS,
ROBERT E. GLUSICK,
BY *Marvin L. Feldberg*
THEIR ATTORNEY.

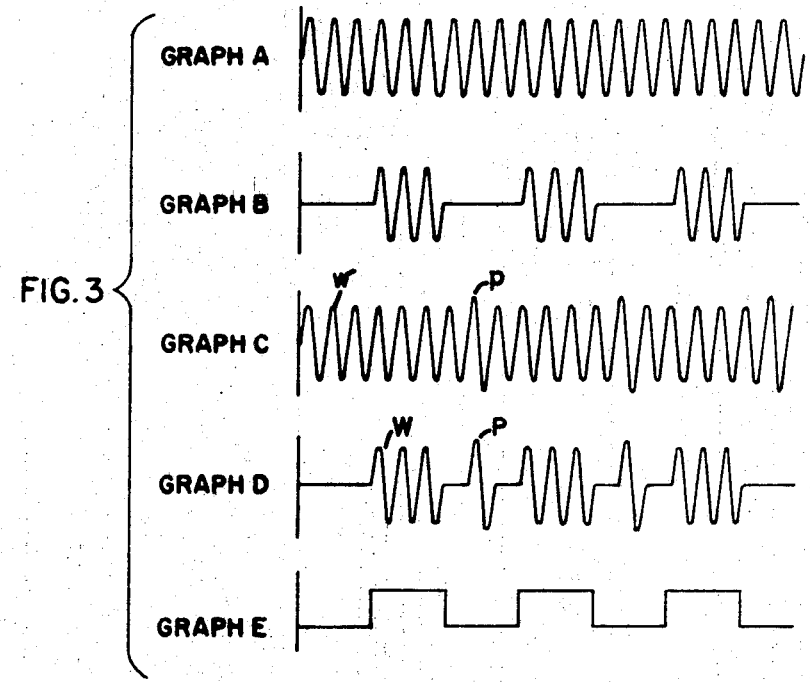
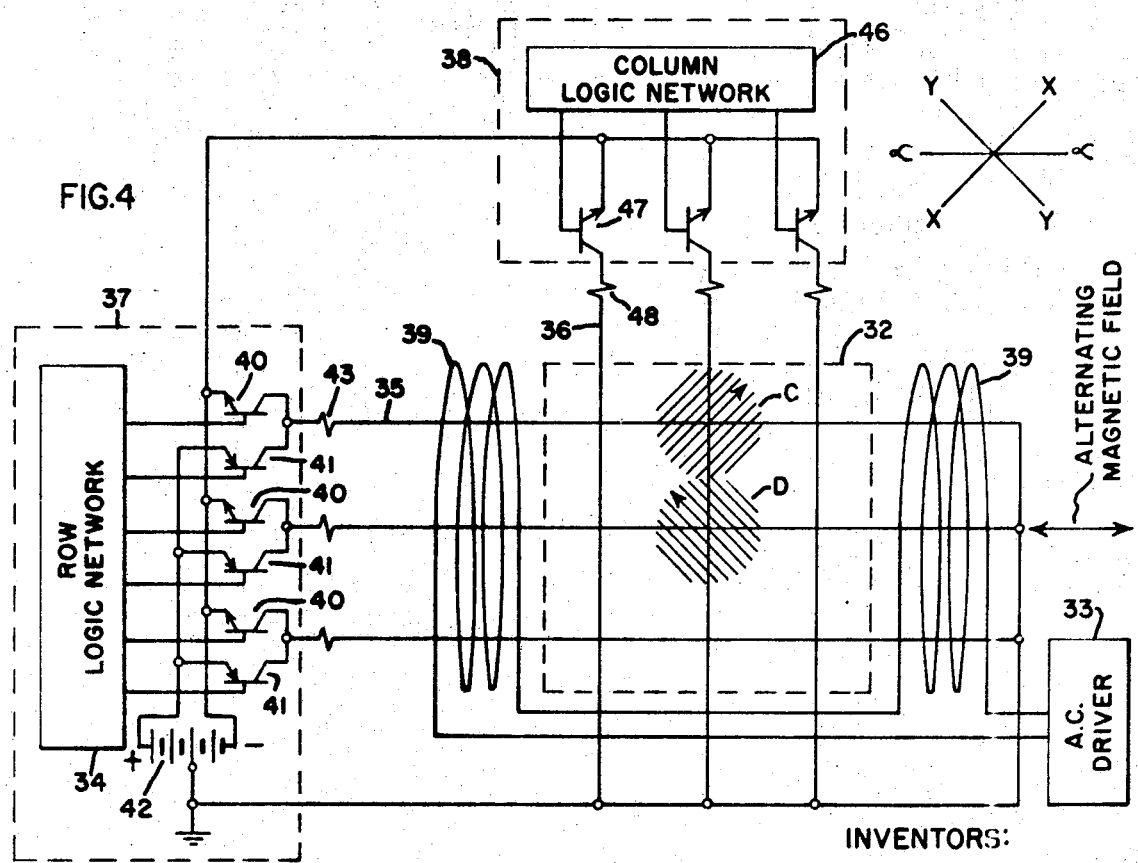

3,545,843
MAGNETO-OPTICAL DISPLAY SYSTEM
Lewis E. Somers, La Fayette, and Robert E. Glusick, Liverpool, N.Y., assignors to General Electric Company, a corporation of New York
Filed Jan. 9, 1969, Ser. No. 790,030
Int. Cl. G02b 5/18
U.S. Cl. 350—162                                    10 Claims

ABSTRACT OF THE DISCLOSURE

A magneto-optical display system wherein optical grating lines formed within a magnetic film structure are oriented by means of an alternating or pulsating magnetic field simultaneously applied to each of the display elements of said film structure in combination with a D.C. magnetic field selectively applied to individual elements by means of intersecting current conductors. The alternating magnetic field is applied by a Helmholtz coil or equivalent structure. Light directed towards the film is diffracted by the optical gratings in accordance with the orientation of said grating lines. In one embodiment the alternating and D.C. fields are combined for orienting the optical grating lines along one of two axes so as to selectively establish both write and erase states within the display. In a second embodiment the D.C. field in combination with the alternating field provide a selective write operation and a modulation component of the alternating field alone controls the erase operation so as to provide an adjustable persistence of the written information.

BACKGROUND OF THE INVENTION

Field of the invention

The invention relates generally to the field of solid state displays of the type having a matrix arrangement of display elements and intersecting conductors for controlling the state of said elements. In particular, the invention relates to magneto-optical systems wherein the display elements selectively diffract incident light.

Description of the prior art

Magnetic films of the type employed in magneto-optical display systems known to the art exhibit an extremely nonlinear response of magnetic domain rotation to applied alternating fields, and a relatively linear response to D.C. magnetic fields. Accordingly, applying D.C. energization to intersecting conductors for rotating the magnetic domain structure at selected display elements results in poor selectivity and appreciable cross talk with respect to adjacent elements. Selectivity is greatly improved by the application of A.C. energization to one of the intersecting conductors so that a composite alternating, D.C. magnetic field is effective at the intersection for controlling the magnetization. However, A.C. energization of individual conductors requires considerably more complex and costly drive circuitry than does a D.C. energization.

As a further point, magneto-optical systems known to the art are of the type which selectively write and erase with regard to discrete display elements within a fixed period of time, normally preferred to be short, but do not possess the property of adjustable persistence.

SUMMARY OF THE INVENTION

It is accordingly one object of the invention to provide a novel magneto-optical display system of the type having a plurality of intersecting current conductors for controlling the display which has an improved driver circuitry for selectively driving the display elements.

It is another object of the invention to provide a novel magneto-optical display system as described wherein the alternating driver circuitry is greatly simplified over that presently required.

It is a further object of the invention to provide a novel magneto-optical display system which exhibits an adjustable persistence characteristic with regard to the written information.

These and other objects of the invention are accomplished in a magneto-optical display system of the type which includes a magnetic film exhibiting rotational anisotropic properties having optical grating lines in accordance with a magnetic domain structure established within said film, and an arrangement of intersecting electrical conductors in physical proximity with said film. The regions of said film associated with the conductor intersections may be said to comprise the system's display elements. The optical gratings are oriented along one of two crossing axes, normally orthogonally related, so as to constitute a write or erase condition in the display. Light energy projected upon the film surface is diffracted in accordance with the orientation of said optical gratings.

In accordance with one aspect of the invention, the intersecting conductors are selectively energized by D.C. current so as to provide at the intersections a resultant D.C. magnetic field oriented along one of the two orthogonally related axes. There is further included means for providing simultaneously to each display element an alternating magnetic field, this field having a direction intersecting that of the resultant D.C. magnetic fields. The alternating magnetic field is applied in one embodiment by means of a Helmholtz coil, and by corresponding structure in other embodiments. The D.C. and alternating magnetic field strengths are adjusted so that the composite magnetic field at the intersection of a pair of energized D.C. conductors exceeds a threshold field required for causing rotation of the magnetization in the plane of the film, and in response to several cycles of the alternating magnetic field orients the associated magnetic domain structure of a selected display element in the direction of the resultant D.C. magnetic field. The composite magnetic field elsewhere in the film at non-selected elements is less than the threshold field, so as not to effect a change in the orientation of the remaining magnetic domain structures.

In accordance with a second aspect of the invention there is provided an adjustable persistence of the written information. The D.C. magnetic field is applied by column and row conductors for generating a resultant D.C. field along a single axis, representing a write condition. The alternating magnetic field is provided with a low frequency, erase modulation, this field being simultaneously applied to each display element along an axis crossing that of the resultant D.C. field, representing an erase condition. The magnitude of the D.C. and alternating fields are adjusted so that for selected display elements at the intersection of a pair of energized conductors, the magnetic domains are oriented in the direction of the direction of the resultant D.C. field. For all other display elements, the magnetic domains become oriented in the direction of the alternating magnetic field in response to several cycles of the modulated component of that field.

BRIEF DESCRIPTION OF THE DRAWING

The specification concludes with claims particularly pointing out and distinctly claiming the subject matter which is regarded as the invention. It is believed, however, that both as to the organization and method of operation, together with further objects and advantages thereof, the invention may be best understood from the description of the preferred embodiments, taken in connection with the accompanying drawing in which:

FIG. 1 is a schematic diagram in perspective view of a magneto-optical display system in accordance with a generic concept of the invention;

FIG. 2 is a partially broken away perspective view of the magnetic film employed in the system of FIG. 1;

FIG. 3 is a series of graphs employed in a description of the invention;

FIG. 4 is a schematic circuit diagram of a first specific embodiment of the invention;

FIG. 7 is a schematic circuit diagram of a second embodiment of the invention;

FIG. 8 is a perspective view illustrating a second modification of the embodiment of FIG. 4; and FIG. 9 is a perspective view illustrating a third modification of the embodiment of FIG. 4.

DESCRIPTION OF THE PREFERRED EMBODIMENTS

Figure 5:
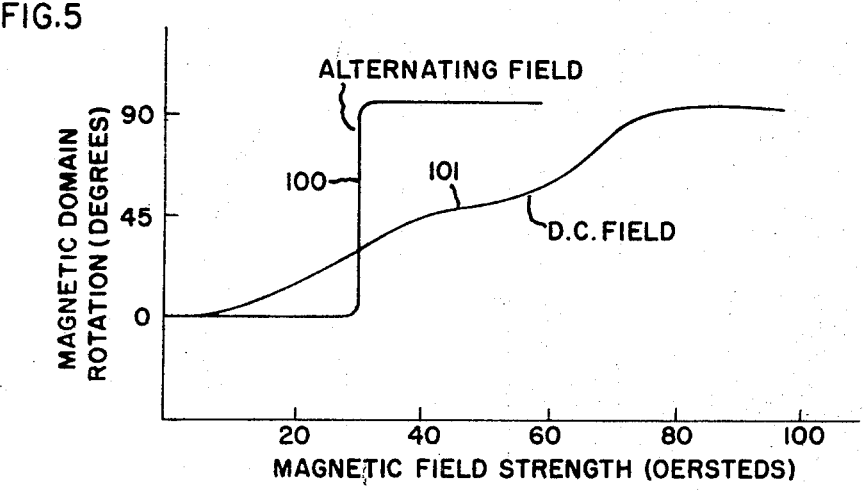
FIG. 5 are magnetization curves employed in a description of the invention.

In FIG. 1 there is schematically illustrated in perspective view a magneto-optical display system in accordance with a generic form of the invention. Light energy from a light source 1, which may include a common incandescent lamp, is incident upon the surface of a display medium 2 which includes a large number of display elements for selectively modulating the light, two of which are illustrated at A and B. Accordingly, light is diffracted from the surface of medium 2 in accordance with the orientation of the optical grating lines formed at elemental regions of said medium, which constitute the display elements. The gating lines have a spacing on the order of the wavelength of the incident light. One of the higher orders of diffracted light, preferably the first order, is viewable through a window 4. The optics is shown as a direct illumination, direct view system, considered adequate for purposes of the invention.

Information is introduced to the display elements by a selective orientation of the optical grating lines along one of two crossing axes, normally orthogonally arranged. It is contemplated that light from source 1 be focused upon all of the display elements in parallel. However, it may be readily appreciated that the light can be narrowly focused and scanned over single elements or groups of elements, as requirements of the system dictate. Orienting the optical grating lines along one axis, for example the Y axis as at element A, causes the first order diffracted light to be diffracted in the direction of the X axis, in accordance with established light diffraction theory. This light, indicated by construction line $a$, passes through the window 4. Orienting the optical grating lines along the X axis at element B, causes the first order diffracted light to be diffracted in the direction of the Y axis and pass well outside of the window 4, shown by construction line $b$. Accordingly, displayed information is obtained from the energy passing through the window 4 and is comprised of the presence and absence of light at the various display elements.

The display medium 2 includes a ferromagnetic film 3 having magnetic domains occurring in a regular line or striped pattern which produce the optical grating lines. The magnetic domain structure, and therefore the optical gratings, are oriented in the plane of the film 3 along either the X or Y axis by applied alternating and D.C. magnetic fields. The D.C. magnetic field is selectively applied to the display elements of the display medium 2 by energizing a first and second plurality of parallel conductors 5 and 6 arranged in a row and column configuration. The conductors 5 and 6 intersect one another at points in close proximity with the magnetic film 3, each intersection being magnetically coupled to a corresponding display element. Row and column driver circuits 7 and 8 provide a D.C. energization for the row and column conductors 5 and 6, respectively. A uniform alternating magnetic field is simultaneously applied to each of the display elements, as by means of Helmholtz coils 9 energized by an A.C. driver circuit 10. The selective energization of the conductors 5 and 6 and the energization of the Helmholtz coils 9 provide orientation of the optical grating lines of individual display elements.

The alternating magnetic field is predominantly a periodically changing bipolar field for producing a highly nonlinear response in magnetic domain rotation. It is typically a sinusoidal wave. However, it may take the form of other bipolar waveforms, such as a rectangular bipolar wave, for which means other than a coil is preferred for supplying the magnetic field. The alternating field may be continuously applied or pulse modulated, such as schematically shown by the Graphs A, B, C and D of FIG. 3. The D.C. magnetic field is applied as pulses of a width corresponding to several cycles of the alternating field, shown by Graph E. It is noted that Graphs A and B pertain to a selective write and erase operation, Graph A being a continuous waveform of fixed frequency and Graph B a pulsed waveform of several cycles of said fixed frequency. Graphs C and D pertain to an adjustable persistence operation, having write frequency components $w$ and W, respectively, which correspond to the waveforms of Graphs A and B for selective writing, and erase, low frequency modulation components $p$ and P, respectively, for performing a slow erasure.

In accordance with a selective write and erase operation, D.C. energization is applied to the row and column conductors 5 and 6, in pairs, for orienting the resultant D.C. magnetic field along either the X or Y axis, pursuant to a write or erase condition. The alternating magnetic field, such as shown by Graph A or B in FIG. 3, is oriented along the $\alpha$ axis which bisects the X and Y axes. At the intersection of a pair of energized conductors, the alternating magnetic field acts in concert with the resultant D.C. magnetic field to provide a combined field exceeding the threshold for magnetic domain rotation in the plane of the film, which field orients the magnetic domain structure in the direction of the resultant D.C. field. In the remaining display elements the combined fields are below threshold, i.e., they are insufficient to cause rotation of the associated domain structures.

In accordance with an adjustable persistence operation, row and column conductors 5 and 6 are energized in pairs to provide a resultant D.C. magnetic field along a single axis, for example the Y axis, normally representing a write condition. The alternating magnetic field, such as shown by Graph C or D in FIG. 3, is oriented along the orthogonal X axis. The resultant D.C. field in combination with the write frequency component of the alternating field orient the magnetic domain structure at selected display elements in the direction of the resultant D.C. field for writing information. The erase, low frequency modulation component of the alternating field is of sufficient magnitude to orient the magnetic domain structure as it is directed in all remaining display elements for erasing information. Adjustment of the frequency of the low frequency modulation component controls the erasure time and provides an adjustable persistence of written information.

A partially broken away perspective view of a portion of the display medium 2, including several of the row and column conductors 5 and 6, is shown in FIG. 2. The row conductors 5 are formed onto a substrate 20, which may be composed of glass. Overlaying the row conductors and insulated from them by a layer 21, such as of silicon monoxide, are deposited the column conductors 6. The column and row conductors may be formed by a conventional electroplating process. A glass sheet 22, on the order of several mils thick, covers the column and row conductors. Deposited on sheet 22 is a thin ferromagnetic film 23 fabricated to exhibit rotational anisotrophy. The magnetic film, having a critical thickness of at least 10,000 A., is fabricated to have magnetostriction and internal stress values of opposite sign for forming fine line changes in the magnetic field gradient normal to the plane of the magnetic film, which correspond to a striped magnetic domain structure at the surface of the film. A magnetic film that has been employed is a nickel-iron permalloy film, 85% nickel and 15% iron, electroplated to a thickness of 20,000 to 30,000 A. over sputtered gold. A negative magnetostriction and a tensile stress was used for the nickel rich composition. The magnetic film was prepared using a sulphate bath similar to that disclosed in U.S. Letters Pat. No. 3,234,525, "Thin Film Devices," issued Feb. 8, 1966 to Irving W. Wolf, assigned to the assigned to the assignee of the present invention.

A colloidal suspension of ferromagnetic particles having dimensions on the order of several hundred angstroms, typically in the form of an aqueous solution 24, overlays the surface of the magnetic film. The ferromagnetic particles conglomerate in conformance with the magnetic domain structure so as to form an optical grating capable of diffracting light. A glass cover 25 about 50 mils thick provides a seal for the solution 24 by being placed over the solution and around the edges of the structure to the glass sheet 22.

In FIG. 4 there is illustrated a schematic diagram of one specific embodiment of the invention, showing details of the electrical drive circuitry but not including the optical components, wherein a resultant D.C. magnetic field and a uniformly applied alternating magnetic field are combined to selectively orient the optical grating lines associated with individual display elements for both write and erase operations. For simplicity of illustration, only a limited number of conductor intersections defining display elements are shown. In a typical operable embodiment several hundred to several thousand elements per square inch may comprise a display.

A display medium 32, corresponding to the structure of FIG. 2, is schematically shown in plan view. The display medium has row conductors 35 and column conductors 36, controlled by row and column driver circuits 37 and 38 which selectively apply a D.C. energization to intersecting row and column conductors, respectively. A uniform alternating magnetic field is applied to the entire matrix by means of an A.C. driver circuit 33 which energizes Helmholtz coils 39. The frequency for the driver circuit 33 may extend from several Hz. to several mHz. and is typically 1 mHz. The coils 39 provide a uniform magnetic field to the display medium 32 in the plane of the magnetic film. For a 2 x 2 inch display, a pair of 10 inch diameter coils, typically of 100 turns No. 20 wire, spaced apart by about 10 inches, are found to provide an adequately uniform field.

The row driver circuit 37 includes a conventional logic network 34 which supplies inputs to a plurality of high speed, high current driver gates that comprise pairs of complementary transistors 40 and 41 commonly connected to the row conductors 35. Components 40 are n-p-n transistors having their emitters connected to the negative terminal of a D.C. source 42 with a center tap to ground. The collector electrodes of transistors 40 are connected through associated current limiting resistors 43 to the conductors 35, the opposite end of conductors 35 being returned to ground. The base electrodes of transistors 40 have control signals supplied by the logic network 34 for establishing a write condition. Components 41 are p-n-p transistors which have their emitters connected to the positive terminal of D.C. source 42, and their collector electrodes forming a junction with the collectors of transistors 40 for conducting current through conductors 35 in the opposite direction to that conducted by transistors 40. The base electrodes of transistors 41 are supplied with control signals from logic network 34 to establish an erase condition.

The column driver circuit 38 includes a conventional logic network 46 and a plurality of high speed, low impedance driver gates that include n-p-n transistors 47. These components have their emitters connected to the negative terminal of D.C. source 42 and their collectors connected through current limiting resistors 48 to the column conductors 36, the opposite ends of which are returned to ground. The logic network 46 supplies control signals to the base electrodes of the transistors 47.

Considering an exemplary operation of the system, pairs of row and column conductors are selectively energized by a pulsed D.C. current, such as shown by Graph E. of FIG. 3. In combination with several cycles of A.C. energization, such as shown by Graph A or B of FIG. 3, a write or erase condition is established at given display elements. For example, conduction of transistor 47 of the second column and transistor 40 of the first row establishes a resultant D.C. magnetic field along the X axis, as shown at element C. The resultant D.C. field is not of sufficient magnitude itself to rotate the magnetic domain structure in the plane of the film. However, concurrent with the D.C. field, the alternating magnetic field is applied to all display elements along the α axis. In response to the applied D.C. and alternating fields, the magnetic domain structure and therefore the optical lines of display element C will align along the X axis, corresponding to a write condition. A minimum of several cycles of the alternating magnetic field must be applied concurrently with the D.C. field to cause rotation of essentially the total magnetic domain structure. Accordingly, it may be observed that the minimum writing time is a function of the A.C. frequency. It will be seen that the minimum erasure time is likewise a function of the A.C. frequency.

For a typical operation in which the alternating field is pulse modulated as shown by Graph B of FIG. 3, there may be 10 cycles of 1 mHz. A.C. energy within each pulse, and a pulse width of 10 microseconds. The resultant D.C. magnetic field is applied for an equal or slightly longer time, shown by Graph E. The alternating field may also be applied continuously, as in Graph A, in which event the D.C. pulses correspond in length to an adequate number of A.C. cycles to establish rotation of the total magnetic domain structure.

In FIG. 5 are shown response curves 100 and 101 for the alternating and D.C. magnetic fields, respectively, wherein magnetic domain rotation expressed in degrees is plotted against magnetic field strength expressed in oersteds. The illustrated curves are typical for the class of magnetic film under consideration. It may be seen that the alternating curve 100 exhibits an extremely abrupt response at a field strength of about 30 oersteds. As previsously mentioned, it is necessary that at least several cycles of the alternating field, on the order of 8 to 10 cycles, be applied for a 90° rotation of the total domain structure. The D.C. curve 101 exhibits a response having a relatively small amount of nonlinearity, achieving a magnetic domain rotation of 90° at about 80 oersteds.

The curves shown in FIG. 5 are obtained with the magnetic fields separately applied. It is found that when combined alternating and D.C. magnetic fields are applied along intersecting axes, as in the present configurations, there is established a threshold field below which there is essentially 0° rotation of the magnetic domain structure in the plane of the film and above which a 90° rotation may occur which is in the direction of the resultant D.C. field. In the embodiment of FIG. 4 a threshold field is found to exist for a value of the alternating magnetic field immediately below the knee of the curve 100, and a value of the D.C. magnetic field that is relatively low. A typical range of values for threshold for the curves of FIG. 5 are 26 to 28 oersteds alternating field and 12 to 14 oersteds D.C. field. It is critical that the applied fields exceed threshold only at the intersection of energized conductors, and do not reach threshold at the remaining intersections, in particular at the remaining display elements common to the energized column and row conductors.

For establishing an erase condition in the system of FIG. 4, selected transistor gates 41 and 47 are actuated. For example, conduction of transistor 47 of the second column and transistor 41 of the second row establishes at the associated display element D a resultant D.C. magnetic field along the Y axis. This field in combination with several cycles of the alternating magnetic field orients the magnetic domain structure in the direction of the Y axis, representing an erase condition. For a selective erase operation, the same considerations apply regarding a threshold value of the combined alternating and D.C. magnetic fields as indicated above. Accordingly, the remaining display elements have insufficient magnetic field strength applied to cause rotation of their optical gratings.

Figure 6:
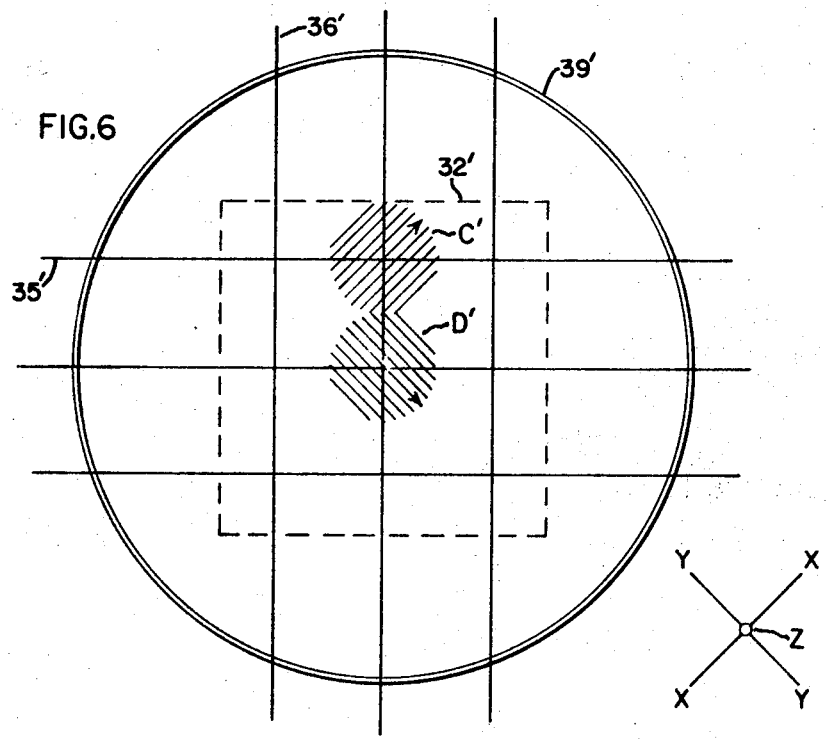
FIG. 6 is a schematic circuit diagram illustrating a modification of the embodiment of FIG. 4.

In FIG. 6 is a modified embodiment of the system of FIG. 4, wherein the alternating magnetic field is directed along the Z axis which is orthogonal to the plane of the magnetic film. Shown are only a display medium 32', in plan view, row and column conductors 35' and 36' and a coil structure 39', corresponding to the similarly identified components in FIG. 4. The coil structure 39', which for purposes of illustration is a fraction of actual size, is rotated 90° from its previous position about an axis in the film plane. It should be appreciated that the drive circuitry for applying the D.C. and A.C. magnetic field components and the remaining structure may be the same as in FIG. 4. It is found that directing the alternating field along the Z axis produces a combined alternating, D.C. magnetic field similar to that previously considered in FIG. 4 which exceeds a threshold field for rotating the magnetic domain structure in the plane of the film at selected display elements, as shown at elements C' and D'.

Referring once more to the system of FIG. 4, the system can be operated to provide an adjustable persistence of the written information. For this operation the conductors 35 and 36 provide only a selective write operation. Current is conducted in but a single direction through conductors 35, for example through transistors 40, transistors 41 being inoperable. A low frequency modulation component is added to the alternating waveform, as shown by Graphs C and D in FIG. 3. For the write operation, the D.C. field and the write frequency component of the alternating field are adjusted as previously considered wherein the combined alternating and resultant D.C. fields exceed threshold, with the resultant D.C. field at the intersection of energized conductor pairs determining the direction in which the optical grating lines are aligned. For the erase operation, the erase, low frequency modulation component of the alternating magnetic field provides a field of increased magnitude so as to slightly exceed the knee of the alternating curve 100 in FIG. 5. Thus, several cycles of the erase, low frequency component will alone effect rotation of the magnetic domain structure in the plane of the film, orientation being along the axis of said alternating field. Erasure occurs at all display elements which have no D.C. field applied and at the remaining display elements common to the energized conductors, where the erase, low frequency component of the alternating magnetic field predominates over the D.C. field component. The erasure time, which is also the persistence period, may be readily controlled by adjusting the frequency of said erase, low frequency component. It is seen that for the adjustable persistence operation described with respect to the structure of FIG. 4, the erase direction is along the α axis and the write direction along the X axis, these axes being 45° apart. Although this will provide acceptable performance, lesser constraints are placed on the optical components by providing write and erase directions at maximum angular separation, i.e., 90°. Such a modified system providing an adjustable persistence is illustrated in FIG. 7.

Referring to FIG. 7, the resultant D.C. magnetic field for establishing a write condition is applied along the X axis to a display medium 52, which may be identical to that previously considered. The alternating field is applied in an orthogonal direction along the Y axis by means of Helmholtz coils 59 rotated in the plane of the display medium by 45° from the structure of FIG. 4. As before, the alternating field is uniformly applied to the display medium 52 by means of an A.C. driver circuit 53 which energizes the Helmholtz coils 59.

A row logic network 54 supplies control signals to a plurality of n-p-n transistors 57 which conduct current in a single direction to row conductors 55. Column conductors 56 are energized through a plurality of n-p-n transistors 58 controlled by column logic network 60. The emitter electrodes of transistors 57 and 58 are commonly connected to the negative terminal of a D.C. source 61, the positive terminal of which is connected to ground. The collector electrodes of transistors 57 are connected through current limiting resistors 62 to the row conductors 55, the opposite ends of which are returned to ground. The collector electrodes of transistors 58 are connected through current limiting resistors 63 to the column conductors 56, the opposite ends of which are returned to ground. The base electrodes of transistors 57 and 58 are connected, respectively, to logic networks 54 and 60.

In the operation of the system of FIG. 7, information is written into the display by the selective energization of pairs of conductors 55 and 56 and application of the alternating field. Accordingly, as previously considered, there is applied a resultant D.C. magnetic field along the X axis which in combination with several cycles of the write frequency component of the alternating field along the Y axis orient the optical grating lines in the direction of the D.C. resultant field, as shown in element E. Information is erased in the absence of a resultant D.C. magnetic field, under the influence of several cycles of the erase modulation component of the alternating magnetic field, as shown at element F. Accordingly, during the write sequences of the operation, the combined alternating and D.C. field at the intersection of energized conductor pairs exceeds the threshold level and provides orientation of the optical grating lines in the direction of the D.C. resultant field. For performing the erase function, the effective alternating magnetic field strength is of increased magnitude so as to exceed the threshold level and itself rotate the optical grating lines in the direction of the alternating field.

As previously stated, the alternating field may be applied in a continuous manner or in pulse modulated form. The writing period is normally required to be much shorter than the erasing or persistence period, e.g., orders of magnitude shorter. This requirement is readily satisfied by modulating the alternating waveform with an erase, low frequency component, as shown in Graphs C and D of FIG. 3. Thus, as in Graph C, the alternating waveform may be generated with a write component $w$ of relatively high frequency and fixed amplitude, several cycles of which accommodate the write operation. A modulation component *p* of relatively low frequency provide an amplitude slightly higher than said fixed amplitude, several cycles of which perform the erase operation. Correspondingly, for a waveform as in Graph D, bursts of several cycles of the alternating wave included in the pulses W are employed for the write operation. Several cycles of the greater magnitude short pulses P are employed for erase.

It may be observed that a single erase operation sequence is interleaved with several write operation sequences so that the two operations occur concurrently. Further, the erase modulation components preferably occur in the intervals separating the D.C. pulses so as to avoid spurious responses in the operation of the display. A typical operation may include writing and erasing periods of 10 microseconds and one section, respectively. For a requirement of 10 cycles of the respective frequencies for each operation, there will be a 1 mHz. write frequency and a 10 Hz. erase frequency. The persistence may be readily adjusted by controlling the erase frequency.

In FIG. 8 is a perspective view of a further modified embodiment of the system of FIG. 4. A field coil 70 wound on a coil form 71 of flat configuration is positioned at the underside of the display medium 72. The display medium is similar to that previously considered, including a magnetic film 73 and underlying row and column conductors 75 and 76, respectively. The field coil 70 is employed in lieu of the Helmholtz coils of FIG. 4 for providing a uniform alternating magnetic field in the plane of the magnetic film 73. The drive circuitry and the associated structure may be the same as in FIG. 4, and has not been shown. In FIG. 8 the alternating field is in the direction shown and is generated by the conductor lengths on the upperside of the coil form 71. The coil form 71 has a depth sufficient to prevent interference in the plane of the film between the fields generated by the conductor lengths on the lower and upper sides of the coil form. The operation of the structure for rotating the optical gratings to provide a selective write or erase, or adjustable persistence, is the same as described with respect to FIG. 4, and will not be further considered.

A final embodiment of the system of FIG. 4 is shown in perspective view in FIG. 9. In this embodiment, integral with the display medium structure 82, are included an additional group of parallel conductors 84 for providing the alternating magnetic field in the plane of the magnetic film 83. An A.C. driver circuit 87 is connected directly to the conductors 84 for simultaneously energizing each of said conductors. The remaining structure may be the same as appears in FIG. 4. The conductors 84 are fabricated to lie adjacent and to be insulated from the row and column D.C. conductors 85 and 86. The conductors 84 are shown more closely spaced and more numerous than the row and column conductors. It may be appreciated that the conductors 84 may be located external to the display medium as well as integral therewith, and with spacing different from that illustrated. The critical requirement for their location and spacing is that there will be provided a uniform alternating field in the plane of the magnetic film. The operation of the embodiment of FIG. 9 is as considered with respect to FIG. 4.

The appended claims are intended to be construed to include all modifications which fall within the true scope of the invention.

What we claim as new and desire to secure by Letters Patent of the United States is:

1. A magneto-optical display system, comprising:
   (a) display medium including a magnetic film constructed to have a regular magnetic domain structure producing corresponding optical grating lines that can be rotated in the plane of said film in response to applied magnetic fields that exceed a threshold level exhibited by said magnetic film,
   (b) a first and second plurality of intersecting current conductors in proximity with and magnetically coupled to said film, regions of said film at the intersections of said conductors constituting display elements of the medium,
   (c) D.C. means for energizing selected pairs of intersecting conductors with D.C. current for applying a resultant D.C. magnetic field to discrete display elements, and
   (d) further means for applying an alternating magnetic field simultaneously to multiple display elements, the alternating and resultant D.C. magnetic fields being adjusted and applied to said film so as to orient the optical grating lines of the system's display elements along first and second axes in the plane of said film in accordance with write and erase conditions of the display.

2. A magneto-optical display system as in claim 1 wherein
   (a) said D.C. means is arranged and operated to provide selective application of the resultant D.C. magnetic field at discrete display elements along said first or second axis in accordance with a write or erase command, and
   (b) said further means is arranged to apply said alternating magnetic field to said magnetic film along an axis which intersects the angle between said first and second axes, several cycles of the alternating field combined with the resultant D.C. field at the intersection of energized conductor pairs exceeding said threshold level and orienting the associated optical grating lines in the direction of the resultant D.C. field, all other display elements having applied magnetic fields below said threshold level.

3. A magneto-optical display system as in claim 2 wherein said further means is arranged to apply said alternating magnetic field in the plane of said magnetic film.

4. A magneto-optical display system as in claim 2 wherein said further means is arranged to apply said alternating magnetic field orthogonal to the plane of said magnetic film.

5. A magneto-optical display system as in claim 1 wherein
   (a) said D.C. means is arranged and operated to provide selective application of the resultant D.C. magnetic field at discrete display elements along said first axis in accordance with a write command, and
   (b) said further means is arranged to apply said alternating magnetic field in the plane of said magnetic film, said alternating field comprising a write, high frequency component and an erase, low frequency component, several cycles of the write component of said alternating field combined with the resultant D.C. field at the intersection of energized conductor pairs exceeding said threshold level and orienting the associated grating lines along said first axis, and the several cycles of the erase component of said alternating field exceeding said threshold level and orient the associated optical grating lines along said second axis in the absence of said resultant D.C. field.

6. A magneto-optical display system as in claim 1 wherein said further means includes a coil structure situated about said display medium responsive to A.C. energy for providing a uniform A.C. magnetic field to the display elements of said medium.

7. A magneto-optical display system as in claim 6 wherein said A.C. means is a Helmholtz coil.

8. A magneto-optical display system as in claim 1 wherein said further means includes a flat coil structure positioned underneath said display medium responsive to A.C. energy for providing a uniform A.C. magnetic field to the display elements of said medium.

9. A magneto-optical display system as in claim 1 wherein said further means includes a third plurality of current conductors in proximity with and magnetically coupled to said film energized in parallel by a source of alternating energy for providing a uniform alternating magnetic field to the display elements of said medium.

10. A magneto-optical display system as in claim 1 wherein said D.C. means includes a plurality of transistor gates controlled by digital logic means for conducting current from a D.C. source to said first and second plurality of conductors.

References Cited

UNITED STATES PATENTS 3,347,614  10/1967  Fuller et al.

DAVID SCHONBERG, Primary Examiner

P. R. MILLER, Assistant Examiner

U.S. Cl. X.R.

350—151